United States Patent
Zhu et al.

(10) Patent No.: US 11,418,298 B2
(45) Date of Patent: Aug. 16, 2022

(54) METHOD, DEVICE, AND SYSTEM FOR TRANSMITTING DATA

(71) Applicants: BEIJING XIAOMI MOBILE SOFTWARE CO., LTD., Beijing (CN); BEIJING UNIVERSITY OF POSTS AND TELECOMMUNICATIONS, Beijing (CN)

(72) Inventors: Yajun Zhu, Beijing (CN); Juejia Zhou, Beijing (CN); Wei Hong, Beijing (CN); Chunhua Liu, Beijing (CN); Yong Li, Beijing (CN)

(73) Assignees: BEIJING XIAOMI MOBILE SOFTWARE CO., LTD., Beijing (CN); BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 99 days.

(21) Appl. No.: 16/942,333

(22) Filed: Jul. 29, 2020

(65) Prior Publication Data
US 2020/0358564 A1    Nov. 12, 2020

Related U.S. Application Data

(63) Continuation of application No. PCT/CN2018/074554, filed on Jan. 30, 2018.

(51) Int. Cl.
*H04L 1/18* (2006.01)
*H04L 1/16* (2006.01)

(52) U.S. Cl.
CPC .......... *H04L 1/1896* (2013.01); *H04L 1/1621* (2013.01); *H04L 1/1812* (2013.01)

(58) Field of Classification Search
CPC ... H04L 1/1896; H04L 1/1621; H04L 1/1812; H04L 1/08; H04L 1/1861; H04L 1/1614; H04L 1/1864; H04L 1/1607
See application file for complete search history.

(56) References Cited

U.S. PATENT DOCUMENTS

| 2016/0233999 A1 | 8/2016 | Kannan et al. | |
| 2019/0021088 A1* | 1/2019 | Zhang | H04W 72/12 |

(Continued)

FOREIGN PATENT DOCUMENTS

| CN | 101615986 A | 12/2009 |
| CN | 104301077 A | 1/2015 |

(Continued)

OTHER PUBLICATIONS

International Search Report dated Oct. 16, 2018 in Application No. PCT/CN2018/074554 (with English translation), 5 pages.

(Continued)

*Primary Examiner* — Hassan Kizou
*Assistant Examiner* — Abdullahi Ahmed
(74) *Attorney, Agent, or Firm* — Oblon, McClelland, Maier & Neustadt, L.L.P.

(57) ABSTRACT

Aspects of the present disclosure relates to a method, device, and system for transmitting data. The method can include receiving a transport block (TB) transmitted by a transmitting terminal, the TB comprising a plurality of code blocks (CBs), and determining an erroneous CB in the TB, and determining, according to a preset affiliation between CBs and code block groups (CBGs), whether each CBG includes an erroneous CB, any CB corresponding to m CBGs in the affiliation, and m being a preset positive integer. The method can further include, for each CBG, if the CBG includes an erroneous CB, determining that feedback information corresponding to the CBG is a negative acknowledgement (Continued)

(NACK), and if the CBG does not comprise an erroneous CB, determining that the feedback information corresponding to the CBG is a positive acknowledgement (ACK), and transmitting the feedback information corresponding to each CBG to the transmitting terminal.

15 Claims, 12 Drawing Sheets

(56) References Cited

U.S. PATENT DOCUMENTS

| | | | | |
|---|---|---|---|---|
| 2019/0132097 | A1* | 5/2019 | Ma | H04L 1/1861 |
| 2019/0150122 | A1* | 5/2019 | Ying | H04W 72/14 370/329 |
| 2020/0036482 | A1* | 1/2020 | Park | H04L 1/1621 |
| 2020/0059341 | A1* | 2/2020 | Zhang | H04L 5/0007 |
| 2020/0154309 | A1 | 5/2020 | Takeda et al. | |
| 2020/0170018 | A1* | 5/2020 | Gao | H04W 72/042 |
| 2020/0229179 | A1* | 7/2020 | Fan | H04W 16/14 |
| 2020/0374040 | A1* | 11/2020 | Lou | H04L 1/1812 |

FOREIGN PATENT DOCUMENTS

| | | |
|---|---|---|
| CN | 107483160 A | 12/2017 |
| EP | 3 621 344 A1 | 3/2020 |

OTHER PUBLICATIONS

Written Opinion dated Oct. 9, 2018 in Application No. PCT/CN2018/074554 (3 pages).

Qualcomm Incorporated, "CBG-based (re)-transmission", Sep. 21, 2017, 3GPP TSG RAN WG1 Meeting NR#R1-1716430, section 1-3, 16 pages.

ZTE, "CBG construction", Aug. 25, 2017, 3GPP TSG RAN WG1 Meeting #90 R1-1712665, 9 pages.

Extended European Search Report dated Aug. 16, 2021 in European Patent Application No. 18904263.3, 12 pages.

Indian Office Action dated Sep. 10, 2021 in Indian Patent Application No. 202047036070, 6 pages.

Ericsson: "Impact from multi-bit HARQ",3GPP Draft: R2-1704408—Impact From Multi-Bit Haro Feedback, 3rd Generation Partnership Project (3GPP),Mobile Competence Centre • 650 Route Des Lucioles • F-06921 Sophia-Antipolis Cedex •France vol. RAN WG2, No. Hangzhou; May 15, 2017-May 19, 2017 May 14, 2017 (May 14, 2017), XP051274981,Retrieved from the Internet: URL:http://.www.3gpp.org/ftp/Meetings_3GPPSYNC/RAN2/Docs/[retrieved on May 14, 2017].

Samsung:"CBG-based HARQ operations in MAC",3GPP Draft• R2-1712699 3rd Generation Partnership Project (3GPP), Mobile Competence Centre ; 650, Route Des Lucioles • F-06921 Sophia-Antipolis Cedex •France vol. RAN WG2. No. Reno, NV, USA: Nov. 26, 2017-Dec. 1, 2017 Nov. 16, 2017(Nov. 16, 2017), XP051371050,Retrieved from the Internet: URL:http://www.3gpp.org/ftp/tsg%5Fran/WG2%5FRL2/TSGR2%5F100/Docs/[retrieved on Nov. 16, 2017].

Lenovo et al:"UL HARQ-ACK feedback for CBG-based retransmission" 3GPP Draft• R1-1710604 3rd Generation Partnership Project (3GPP), Mobile Competence Centre ; 650, Route Des Lucioles; F-06921 Sophia-Antipolis Cedex: France vol. RAN WG1, No. Qingdao, P.R. China; Jun. 27, 2017-Jun. 30, 2017 Jun. 26, 2017 (Jun. 26, 2017). XP051299811. Retrieved from the Internet: URL:http://www.3gpp.org/ftp/Meetings_3GPP _SYNC/RAN 1 /Docs/ [retrieved on Jun. 26, 2017].

English translation of the Written Opinion of the International Searching Authority dated Oct. 16, 2018 in PCT/CN2018/074554, 4 pages.

Combined Chinese Office Action and Search Report dated Aug. 29, 2019, in Patent Application No. 201880000032.8 (with English translation), 13 pages.

* cited by examiner

| CBG No. | 1 | 2 | 3 | 4 | 5 | 6 | 7 | 8 |
|---|---|---|---|---|---|---|---|---|
| Included CB | CB1 | CB5 | CB9 | CB13 | CB17 | CB21 | CB25 | CB29 |
| | CB2 | CB6 | CB10 | CB14 | CB18 | CB22 | CB26 | CB30 |
| | CB3 | CB7 | CB11 | CB15 | CB19 | CB23 | CB27 | CB31 |
| | CB4 | CB8 | CB12 | CB16 | CB20 | CB24 | CB28 | CB32 |
| | NACK | ACK | ACK | ACK | ACK | ACK | ACK | ACK |

FIG. 5a

| CBG No. | 1 | 2 | 3 | 4 | |
|---|---|---|---|---|---|
| 5 | CB1、2 | CB9、10 | CB17、18 | CB25、26 | NACK |
| 6 | CB3、4 | CB11、12 | CB19、20 | CB27、28 | ACK |
| 7 | CB5、6 | CB13、14 | CB21、22 | CB29、30 | ACK |
| 8 | CB7、8 | CB15、16 | CB23、24 | CB31、32 | ACK |
| | NACK | ACK | ACK | ACK | |

FIG. 5b

METHOD, DEVICE, AND SYSTEM FOR TRANSMITTING DATA

CROSS-REFERENCE TO RELATED APPLICATIONS

This is a continuation application of International Patent Application No. PCT/CN2018/074554, filed on Jan. 30, 2018, the disclosure of which is hereby incorporated by reference in its entirety.

TECHNICAL FIELD

The present disclosure relates to the field of communication technology, and more particularly to a method and device for data transmission.

BACKGROUND

In the wireless communication system, a data retransmission mechanism can be provided to retransmit data when a data transmission error occurs, in order to ensure that the data can be received correctly by the receiving terminal.

In the process of data transmission, the receiving terminal detects whether the received Transport Block (TB) is in error by Cyclic Redundancy Check (CRC). If any Code Block (CB) in the TB is in error, the receiving terminal determines that the TB is in error and feeds back a Negative Acknowledgment (NACK) to the transmitting terminal. If all CBs in the TB are correct, the receiving terminal determines that the TB is correct and feeds back an Acknowledgement (ACK) to the transmitting terminal. The transmitting terminal retransmits the entire TB upon receiving the NACK, and sends a next TB upon receiving the ACK.

SUMMARY

In the related processes of data transmission, even if only one CB in the TB is in error, the entire TB are retransmitted. This can result in the waste of a lot of network resources. A method, device, and system for data transmission are provided by the present disclosure to solve the technical problem in the related art. Technical solutions are described below.

According to a first aspect of the present disclosure, a method for data transmission is provided, which is executed by a receiving terminal includes the following operations. A transport block (TB) from the transmitting terminal is received. The TB includes multiple code blocks (CBs). An erroneous CB in the TB is determined, and whether each code block group (CBG) includes the erroneous CB is determined according to preset affiliation relations of CBs and CBGs, any one CB affiliated to m CBGs and m being a preset positive integer in the affiliation relation.

For each CBG, it can be determined that the feedback information corresponding to the CBG is NACK when the CBG includes the erroneous CB, or it is determined that the feedback information corresponding to the CBG is ACK when the CBG does not include the erroneous CB. The feedback information corresponding to each CBG is sent to the transmitting terminal.

According to a second aspect of the present disclosure, a method for data transmission is provided, which is executed by a transmitting terminal and includes the following operations. A transmission block (TB) is sent to a receiving terminal. The TB includes multiple code blocks (CBs). Feedback information corresponding to each code block group (CBG) sent by the receiving terminal is received.

For each CB included in the TB, when it is determined according to preset affiliation relations of CBs and CBGs that feedback information of all CBGs to which the CB is affiliated is NACK, the CB is retransmitted. In the affiliation relation, any one CB affiliated to m CBGs, and m is a preset positive integer.

According to a third aspect of the present disclosure, a device for data transmission is provided, which includes a processor and a memory having stored thereon at least one instruction. The processor is configured to execute the instruction to implement receiving a transport block (TB) sent by a transmitting terminal, the TB includes multiple code blocks (CBs), determining an erroneous CB in the TB, and determine whether each code block group (CBG) includes the erroneous CB according to preset affiliation relations of CBs and CBGs, any one CB affiliated to m CBGs and m being a preset positive integer in the affiliation relation. Further, the processor can be configured to, for each of the CBGs, determine that feedback information corresponding to the CBG is negative acknowledge (NACK) when the CBG includes the erroneous CB, or determine that feedback information corresponding to the CBG is acknowledge (ACK) when the CBG comprises no erroneous CB, and send the feedback information corresponding to each CBG to the transmitting terminal.

It should be understood that the above general description and the following detailed description are only exemplary and explanatory, and do not limit the present disclosure.

BRIEF DESCRIPTION OF THE DRAWINGS

The accompanying drawings, incorporated into the specification and as a part of the specification, illustrate the embodiments consistent with the disclosure, and together with the specification, serve to explain the principles of the disclosure.

FIG. 5a and FIG. 5b are feedback schematic diagrams of a method for data transmission provided by an exemplary embodiment.

DETAILED DESCRIPTION

Exemplary embodiments are illustrated in detail herein, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Figure 1:
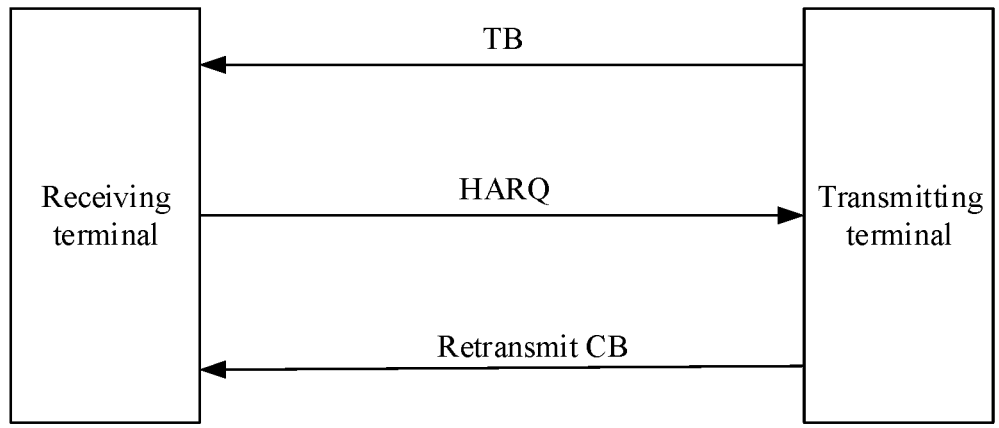
FIG. 1 is a system framework diagram of a method for data transmission provided by an exemplary embodiment.

A method for data transmission is provided in an exemplary embodiment of the present disclosure, which involves a processing mechanism for data retransmission. The method may be implemented by both the transmitting terminal and the receiving terminal, and the system architecture may be as shown in FIG. 1. The transmitting terminal may be any device that can send data in the wireless communication network, and the receiving terminal may be any device that can receive data in the wireless communication network. For example, the transmitting terminal and the receiving terminal may be any device of the base station, the terminal and the relay device or the like. That is, the method can be applied to a process of the base station sending data to the terminal, or the process of the terminal sending data to the base station or the like.

The base station may include components, such as a processor, a memory, and a transceiver. The processor can be a CPU (Central Processing Unit) or the like, which can be configured to determine an erroneous CB in the TB and determine feedback information corresponding to each Code Block Group (CBG), or determine that it is required to retransmit the CB based on the feedback information corresponding to the CBG or the like. The memory can be a random access memory (RAM), a flash memory (Flash) or the like, and can be used to store received data, data required during processing, data generated during processing, such as data of the TB and an affiliation relation of CBs and code block groups (CBGs) or the like. The transceiver can be used for data transmission with the terminal or other network devices, for example, sending a TB to the terminal, or receiving the TB sent by the terminal. The transceiver can include an antenna, a matching circuit, a modem or the like.

The terminal may include components, such as a processor, a memory, and a transceiver. The processor may be a CPU or the like, and may be used to determine an erroneous CB in the TB, determine the feedback information corresponding to each CBG, or determine that it is required to retransmit the CB based on the feedback information corresponding to the CBG or the like. The memory can be an RAM, a Flash or the like, and can be used to store received data, data required during processing, data generated during processing. The transceiver can be used for data transmission with other devices, and may include antennas, matching circuits, modems, and the like. The image detection component may be a camera or the like. The terminal may also include a screen, an image detection component, an audio output component, an audio input component or the like. The screen may be a touch screen. The audio output components can be speakers, headphones or the like. The audio input component may be a microphone or the like.

Figure 2:
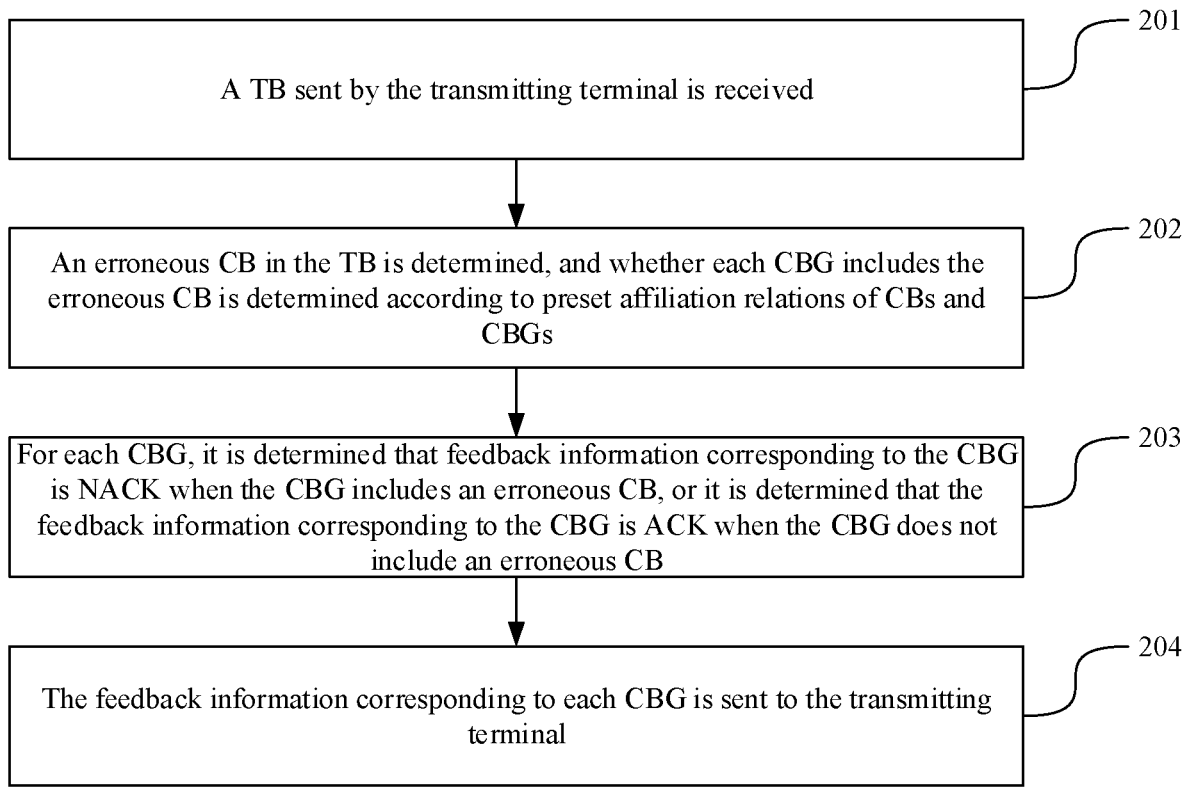
FIG. 2 is a flowchart of a method for data transmission provided by an exemplary embodiment.

As shown in FIG. 2, in an embodiment of the present disclosure, a processing flow of the receiving terminal in the method may include operations 201 to 204.

In 201, a TB sent by a transmitting terminal is received. The TB includes multiple CBs.

In 202, an erroneous CB in the TB is determined, and whether each CBG includes the erroneous CB is determined according to preset affiliation relations of CBs and CBGs. In the affiliation relation, any one CB is affiliated to m CBGs, and m is a preset positive integer.

In 203, for each CBG, it is determined that feedback information corresponding to the CBG is NACK if the CBG includes the erroneous CB, or it is determined that feedback information corresponding to the CBG is ACK if the CBG does not include the erroneous CB.

In 204, feedback information corresponding to each CBG is sent to the transmitting terminal.

The technical solutions provided by the embodiments of the present disclosure may include the following beneficial effects. For example, in the embodiment of the present disclosure, a feedback is performed for the CBG. If an erroneous CB occurs in the TB, only a part CB is retransmitted rather than transmitting the entire TB, thereby reducing waste of network resources.

Figure 3:
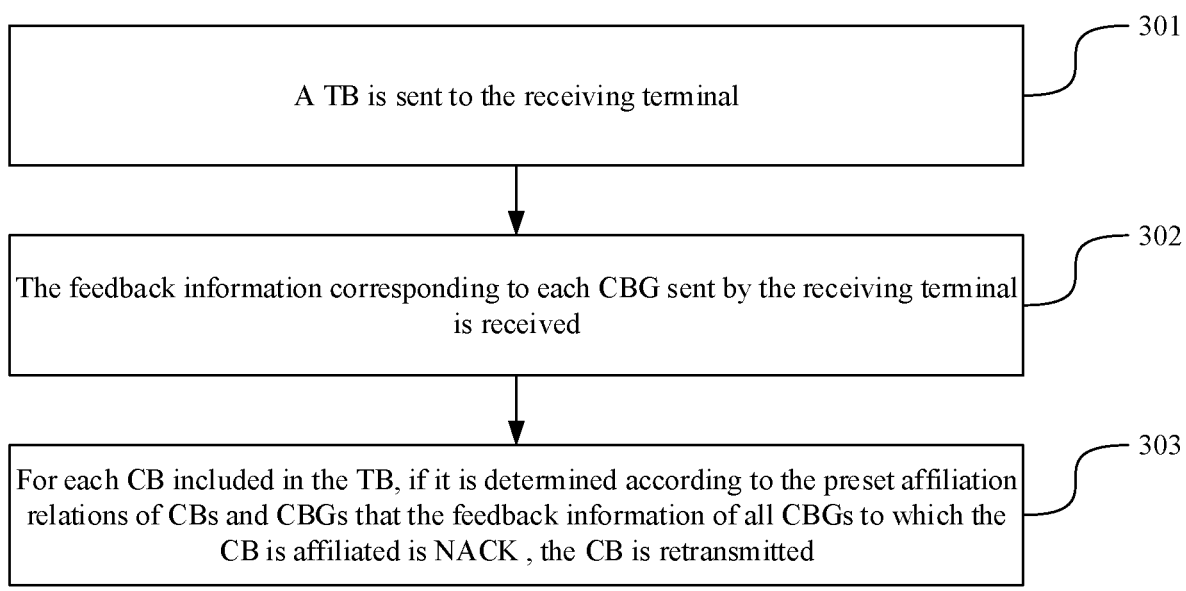
FIG. 3 is a flowchart of a method for data transmission provided by an exemplary embodiment.

As shown in FIG. 3, in another embodiment of the present disclosure, a processing flow of a transmitting terminal in the method may include operations 301 to 303.

In 301, a TB is sent to a receiving terminal. The TB includes multiple CBs.

In 302, feedback information corresponding to each CBG sent by the receiving terminal is received. The different CBGs may correspond to different pieces of feedback information, and the feedback information may be NACK or ACK.

In 303, for each CB included in the TB, if it is determined according to the preset affiliation relation of CBs and CBGs that feedback information of all CBGs to which the CB is affiliated is NACK, the CB is then retransmitted. In the affiliation relation, any one CB is affiliated to m CBGs, and m is a preset positive integer.

Figure 4:
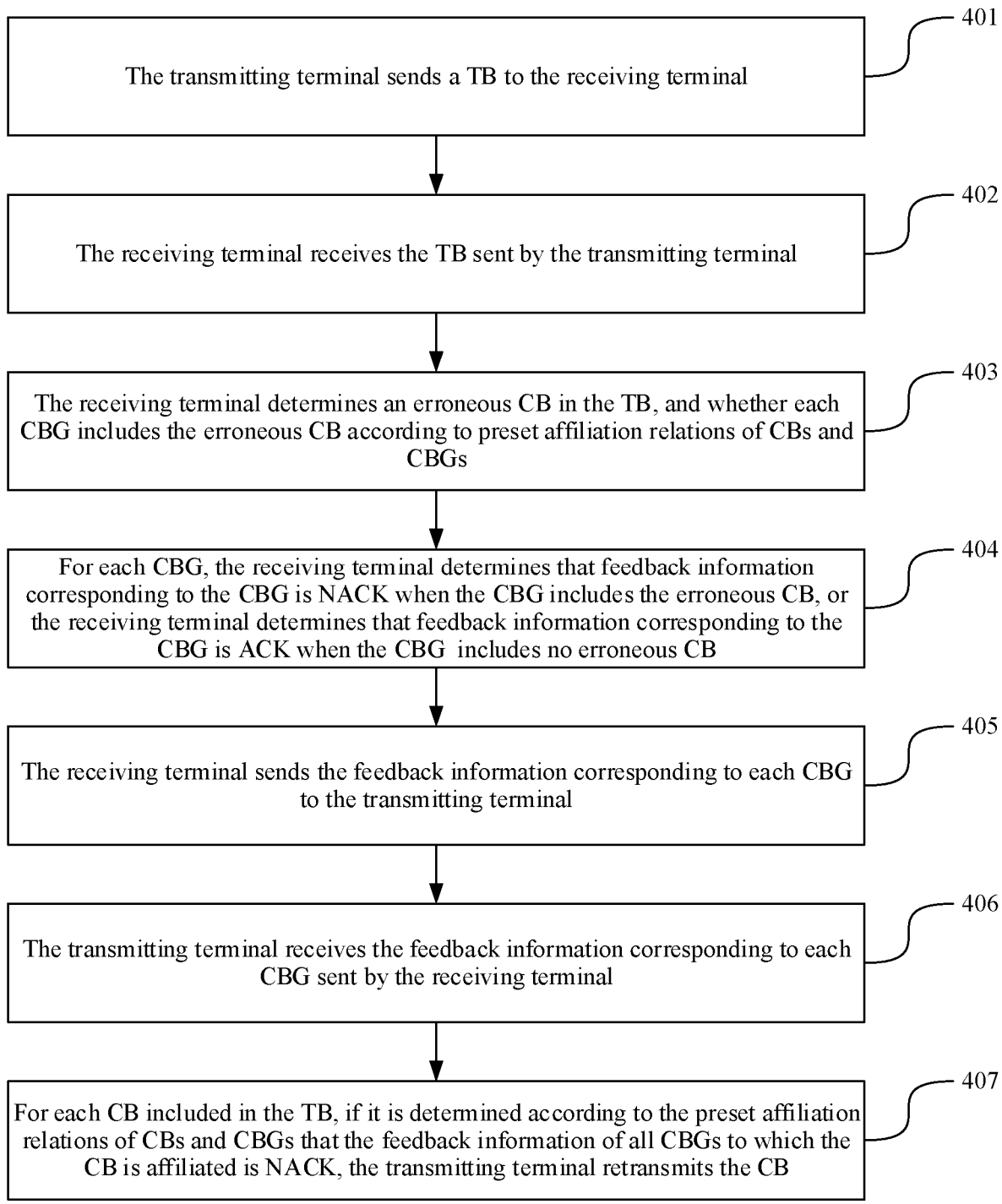
FIG. 4 is a flowchart of a method for data transmission provided by an exemplary embodiment.

As shown in FIG. 4, in another embodiment of the present disclosure, a processing flow of interaction between the transmitting terminal and the receiving terminal in the method may include operations 401 to 407.

In 401, the transmitting terminal sends a TB to the receiving terminal. The TB and the CB are units of data transmission, and one TB includes multiple CBs. During the communication between the base station and the terminal, the transmitting terminal is the base station and the receiving terminal is the terminal in downlink data transmission. In the implementation, after detecting that a TB is required to be sent to the receiving terminal, the transmitting terminal sends the TB to the receiving terminal and waits for feedback information from the receiving terminal.

In 402, the receiving terminal receives the TB sent by the transmitting terminal.

In 403, the receiving terminal determines an erroneous CB in the TB, and determines whether each CBG includes the erroneous CB according to preset affiliation relations of CBs and CBGs. In the affiliation relation, any one CB is affiliated to m CBGs, and m is a preset positive integer. In the implementation, the technician can group the CBs in the TB in advance, to establish an affiliation relation of CBs and CBGs. Each CBG can include multiple CBs, and each CB can be affiliated to m CBGs. The value of m can be set to be 1 or a value greater than 1 based on practical requirements. That is, any one CB can be affiliated to different CBGs. In this way, when feeding back to the receiving terminal, feedback may be executed for each CBG. For a CB, the receiving terminal can determine whether the CB is erroneous based on the feedback information of all CBGs to which the CB is affiliated. In the setting, in order to reduce an error retransmission rate, it is possible to reduce the situation that two CBs are affiliated to the identical CBGs. Several examples of the affiliation relation are given below. In these examples, taking a case that a TB includes 32 CBs as an example, and the number of CBGs is set to be 8.

TABLE 1

| CBG No. | 1 | 2 | 3 | 4 | 5 | 6 | 7 | 8 |
|---|---|---|---|---|---|---|---|---|
| Included CB | CB 1 | CB 5 | CB 9 | CB 13 | CB 17 | CB 21 | CB 25 | CB 29 |
| | CB 2 | CB 6 | CB 10 | CB 14 | CB 18 | CB 22 | CB 26 | CB 30 |
| | CB 3 | CB 7 | CB 11 | CB 15 | CB 19 | CB 23 | CB 27 | CB 31 |
| | CB 4 | CB 8 | CB 12 | CB 16 | CB 20 | CB 24 | CB 28 | CB 32 |

TABLE 2a

| CBG No. | 1 | 2 | 3 | 4 |
|---|---|---|---|---|
| 5 | CB 1, 17 | CB 5, 21 | CB 9, 25 | CB 13, 29 |
| 6 | CB 2, 18 | CB 6, 22 | CB 10, 26 | CB 14, 30 |
| 7 | CB 3, 19 | CB 7, 23 | CB 11, 27 | CB 15, 31 |
| 8 | CB 4, 20 | CB 8, 24 | CB 12, 28 | CB 16, 32 |

TABLE 2b

| CBG No. | 1 | 2 | 3 | 4 |
|---|---|---|---|---|
| 5 | CB 1, 2 | CB 9, 10 | CB 17, 18 | CB 25, 26 |
| 6 | CB 3, 4 | CB 11, 12 | CB 19, 20 | CB 27, 28 |
| 7 | CB 5, 6 | CB 13, 14 | CB 21, 22 | CB 29, 30 |
| 8 | CB 7, 8 | CB 15, 16 | CB 23, 24 | CB 31,32 |

It can be seen that the value of m corresponding to Table 1 is 1, and each group contains 4 CBs. The value of m corresponding to Table 2a is 2, and each group contains 8 CBs. For example, CBG1 contains CB1, CB2, CB3, CB4, CB17, CB18, CB19 and CB20, and CBG5 contains CB1, CB5, CB9, CB13, CB17, CB21, CB25 and CB29. The value of m corresponding to Table 2b is 2, and each group contains 8 CBs. For example, CBG1 contains CB1, CB2, CB3, CB4, CB5, CB6, CB7 and CB8, and CBG5 contains CB1, CB2, CB9, CB10, CB17, CB18, CB25 and CB26.

In the grouping manner shown in Table 2a, the first 16 CBs are successively and individually mapped into a two-dimensional grid, and mapping for the last 16 CBs is implemented by repeating the above steps until the 32 CBs are mapped. In the grouping manner shown in Table 2b, the number of CBs accommodated in each grid (a difference between the numbers of CBs in grids is not greater than 1) is determined, and CBs are mapped to each grid successively.

If the receiving terminal is a terminal, the base station can send the affiliation relation to the terminal in a semi-static manner through a system message, for storage in the terminal. In the implementation, upon receiving the TB, the receiving terminal verifies each CB in the TB by means of CRC to determine an erroneous CB and a correct CB. Whether each CBG contains an erroneous CB is determined based on the preset affiliation relation and the determined erroneous CB and correct CB.

In 404, for each CBG, the receiving terminal determines that the feedback information corresponding to the CBG is NACK if the CBG includes the erroneous CB, or the receiving terminal determines that the feedback information corresponding to the CBG is ACK if the CBG does not include the erroneous CB.

In the implementation, for any CBG, if the CBG contains an erroneous CB, the CBG is determined to be erroneous and feedback information corresponding to the CBG is NACK. If all the CBs included in the CBG are correct CB, the CBG is determined to be correct and feedback information corresponding to the CBG is ACK. As shown in FIG. 5a and FIG. 5b, which illustrate examples of feedback information corresponding to Table 1 and Table 2b respectively, CB2 is assumed to be an erroneous CB.

In 405, the receiving terminal sends feedback information corresponding to each CBG to the transmitting terminal. In the implementation, after determining the feedback information corresponding to each CBG, the receiving terminal can determine a Hybrid Automatic Repeat Request (HARQ) codebook. The number of bits in the HARQ codebook is equal to the number of CBGs. In the above example, there are 8 CBGs, and the HARQ codebook has 8 bits. Each bit represents feedback information of CBG. 0 may be used to represent NACK, and 1 may be used to represent ACK. For the above examples, if the CB2 is erroneous, the HARQ codebook corresponding to Table 1 is 01111111, the HARQ codebook corresponding to Table 2a is 01111011, and the HARQ codebook corresponding to Table 2b is 01110111. The receiving terminal can send the HARQ carrying feedback information to the transmitting terminal.

In 406, the transmitting terminal receives feedback information corresponding to each CBG sent by the receiving terminal.

In 407, for each CB included in the TB, if it is determined that the feedback information of all CBGs to which the CB is affiliated is NACK according to the preset affiliation relation between the CB and CBGs, the transmitting terminal retransmits the CB. In implementation, if the transmitting terminal is a terminal, the affiliation relation between CBs and CBGs may be sent to the terminal by a base station in a semi-static manner through a system message, for storage in the terminal. The receiving terminal and the transmitting terminal use the same affiliation relation. After receiving the HARQ, the transmitting terminal determines feedback information of each CBG. For any CB in the TB, the transmitting terminal can confirm the feedback information of all CBGs to which the CB is affiliated. If the feedback information of these CBGs is NACK, the transmitting terminal retransmits the CB. If it is determined that the feedback information of all CBGs to which the CB is affiliated includes ACK, it means that the CB has no error and another CB in the same group as the CB has an error, and the transmitting terminal does not retransmit the CB and continues to send the following TBs. It should be noted that the retransmitted CB is not necessarily an erroneous CB, but may also be the correct CB that is affiliated to the same CBG as the erroneous CB.

The simulation experiment of data transmission, feedback and retransmission process through the Markov model shows that the higher error correlation of adjacent CBs, the lower the error retransmission rate of the affiliation relation in Table 1; and the lower the error correlation of adjacent CBs, the lower the error retransmission rate of the affiliation relation corresponding to m>1. The lower the correct rate of the CB, the lower the error retransmission rate of the affiliation relation in Table 1; the higher correct rate of the CB, the lower the error retransmission rate of the affiliation relation corresponding to m>1. In the current general network situation, the affiliation relation corresponding to Table 2b has the lowest bit error rate among the three affiliations relations exemplified above. Two sets of experimental data are given in Table 3a and Table 3b for reference. In the experiment of Table 3a, one TB includes 32 CBs, and the HARQ codebook includes 8 bits. In the experiment of Table 3b, one TB includes 64 CBs, and the HARQ codebook includes 16 bits. A CB correlation factor is configured to represent the error correlation of adjacent CBs.

the above affiliation relations shown in Table 1, Table 2a, and Table 2b. In practical, it is not limited to the affiliation relations. The receiving terminal may determine CB sets included in each affiliation relation, and the CBs in the same CB set are affiliated to the same CBG. For example, one column of CBs in Table 1 constitutes a CB set, and CBs in a unit gird in Tables 2a and 2b constitute a CB set.

In operation 2, the CB set containing the erroneous CB is determined, and an error retransmission rate corresponding to the affiliation relation is determined according to the TABLE 3a

| CB correlation factor | a = 0 | a = 0.1 | a = 0.3 | a = 0.5 | a = 0.6 | a = 0.7 | a = 0.8 | a = 0.9 |
|---|---|---|---|---|---|---|---|---|
| CB correct rate | 0.997 | 0.997 | 0.996 | 0.994 | 0.992 | 0.990 | 0.985 | 0.975 |
| Error retransmission rate in a case of m = 1 | 0.102 | 0.101 | 0.102 | 0.103 | 0.100 | 0.104 | 0.102 | 0.100 |
| Error retransmission rate in a case of m = 2 (corresponding to Table 2a) | 0.037 | 0.044 | 0.073 | 0.103 | 0.144 | 0.185 | 0.257 | 0.374 |
| Error retransmission rate in a case of m = 2 (corresponding to Table 2b) | 0.038 | 0.040 | 0.046 | 0.055 | 0.064 | 0.084 | 0.096 | 0.136 |

TABLE 3b

| CB correlation factor | a = 0 | a = 0.1 | a = 0.3 | a = 0.5 | a = 0.6 | a = 0.7 | a = 0.8 | a = 0.9 |
|---|---|---|---|---|---|---|---|---|
| CB correct rate | 0.998 | 0.998 | 0.998 | 0.997 | 0.996 | 0.995 | 0.993 | 0.986 |
| Error retransmission rate in a case of m = 1 | 0.050 | 0.050 | 0.051 | 0.050 | 0.049 | 0.050 | 0.050 | 0.050 |
| Error retransmission rate in a case of m = 2 | <0.001 | 0.001 | 0.003 | 0.009 | 0.015 | 0.026 | 0.040 | 0.066 |

For the above operation 403, a variety of processing methods may be adopted, a fixed value m and a fixed affiliation relation may be used. Alternatively, an appropriate value m and an appropriate affiliation relation may be selected in each feedback process. Several feasible methods for determining the affiliation relation are provided below in this embodiment. It should be illustrated that each affiliation relation uniquely corresponds to one value of m. Therefore, when the affiliation relation is determined, the value of m is determined accordingly.

Figure 6:
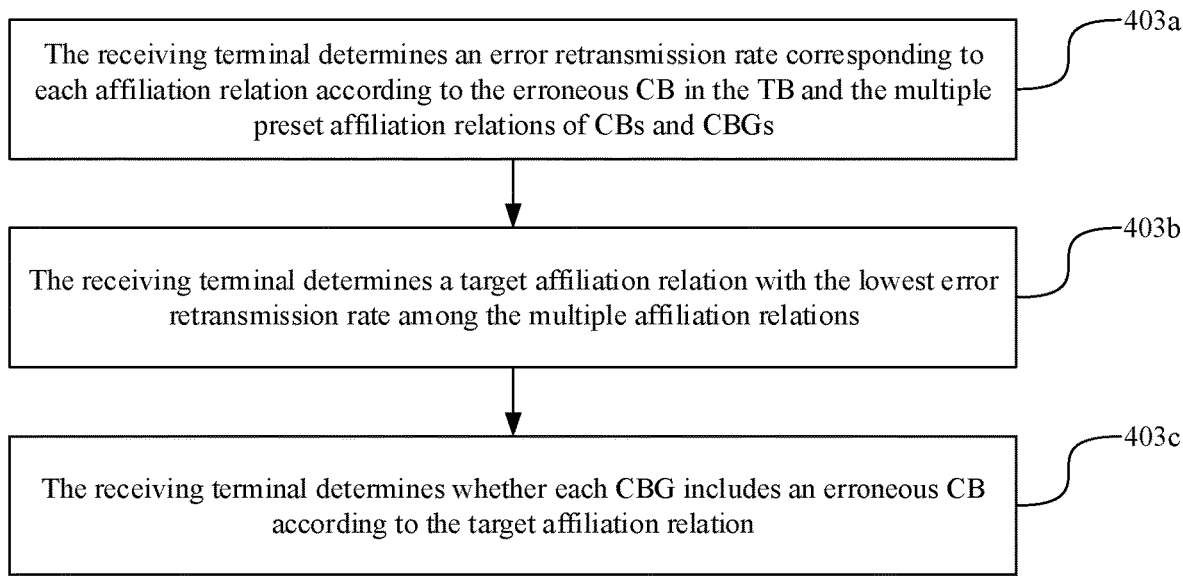
FIG. 6 is a flowchart of a method for data transmission provided by an exemplary embodiment.

In a first method, the affiliation relation with the smallest error retransmission rate is selected. The processing in the above operation 403 can be, as shown in FIG. 6, includes operations 403a to 403c.

In 403a, the receiving terminal determines an error retransmission rate corresponding to each of affiliation relations according to an erroneous CB in the TB and multiple preset affiliation relations of CBs and CBGs. Optionally, the receiving terminal may determine an error retransmission rate based on the logic of retransmission at the transmitting terminal, and the corresponding processing may be includes operations 1 and 2 as follows.

In operation 1, for each of the multiple preset affiliation relations of CBs and CBGs, multiple CB sets included in the affiliation relation are determined. Any two CBs in the same CB set are affiliated to the same CBG, and no CBs from different CB sets are not affiliated to the same CBG. In the implementation, the technician may establish various alternative affiliation relations of CBs and CBGs, for example, number of correct CBs in the CB set containing the erroneous CB and the number of correct CBs in the TB.

In implementation, a retransmission mechanism at the transmitting terminal is explained based on the above embodiment. As long as there is an erroneous CB in a CB set, a correct CB in the set is retransmitted in error. In addition, if there is no erroneous CB in the CB set, or the CB set includes all CBs, the CBs in the CB set will not be retransmitted in error. Therefore, the CB set containing the erroneous CB may be determined, and the sum of the number of correct CBs in all the CB sets containing the erroneous CB is determined as the total number of error retransmissions, and a quotient obtained by dividing total number of error retransmissions by the number of correct CBs in the TB is determined as the error retransmission rate corresponding to the affiliation relation.

In 403b, the receiving terminal determines a target affiliation relation with the lowest error retransmission rate among the various affiliation relations. In the implementation, because each affiliation relations uniquely corresponds one value of m, the value of m is determined after determining the target affiliation relation. For example, after determining to adopt the affiliation relation of Table 2b, the value of m is determined to be 2.

In 403c, the receiving terminal determines whether each CBG includes the erroneous CB according to the target affiliation relation. In the target affiliation relation, any one CB is affiliated to m CBGs, and m is a preset positive integer.

Figure 7:
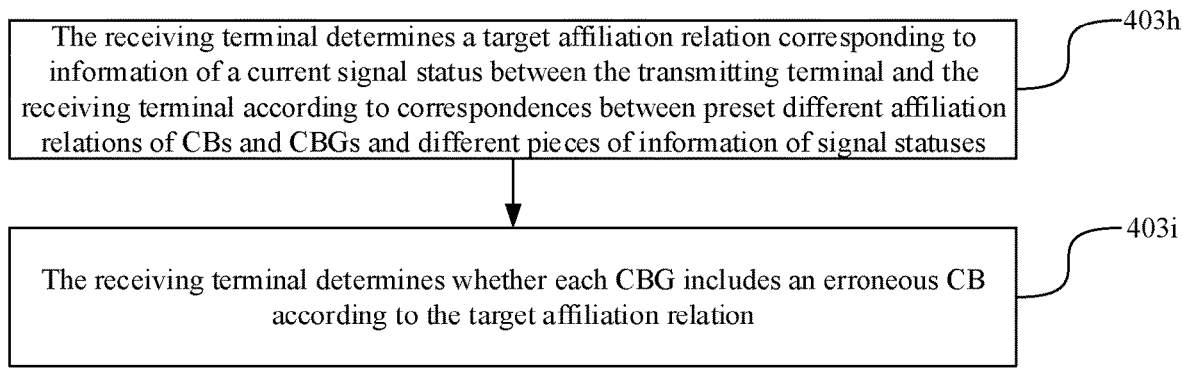
FIG. 7 is a flowchart of a method for data transmission provided by an exemplary embodiment.

In a second method, the affiliation relation is selected according to information of a signal status. The processing of the above operation 403 may, as shown in FIG. 7, includes operations 403h to 403i. In 403h, the receiving terminal determines a target affiliation relation corresponding to information of a current signal status between the transmitting terminal and the receiving terminal according to preset correspondences between different affiliation relations of CBs and CBGs and different pieces of information of signal statuses.

The information of signal status is information that determines quality of a signal between the transmitting terminal and the receiving terminal, and may include a distance between the transmitting terminal and the receiving terminal, a moving speed of the receiving terminal or the transmitting terminal, and so on.

In the implementation, the technician can establish correspondences between affiliation relations and pieces of information of signal statuses in advance. Technicians can determine bit error rates under different pieces of information of signal statuses through experiments, and based on the bit error rate corresponding to any one piece of information of the signal status and a preset correlation factor (reflecting error correlation of adjacent CBs), conduct the simulation experiments through the Markov Model to determine the error retransmission rate corresponding to each of affiliation relations, and select the affiliation relation with the lowest error retransmission rate as the affiliation relation corresponding to the information of the signal status to establish the correspondences between the affiliation relations and the pieces of information of signal statuses. The correspondences can be shown in Table 4.

TABLE 4

| Information of signal status | Affiliation relation |
| --- | --- |
| Information of signal status 1 | Affiliation relation A |
| Information of signal status 2 | Affiliation relation B |
| Information of signal status 3 | Affiliation relation C |
| ... | ... |

After receiving the TB, the receiving terminal can determine information of a current signal status between the transmitting terminal and the receiving terminal, and then look up the above correspondences for the affiliation relation (that is, the target storage relation) corresponding to the information of the current signal status.

In 403i, the receiving terminal determines whether each CBG includes the erroneous CB according to the target affiliation relation. In the target affiliation relation, any one CB is affiliated to m CBGs, and m is a preset positive integer.

For the above embodiment, in each feedback process, an appropriate value of m and the appropriate affiliation relation are selected. When executing the operation 406, the receiving terminal notifies the transmitting terminal of the selected m. Correspondingly, the transmitting terminal obtains the m notified by the receiving terminal. When performing the operation 407, the transmitting terminal determines the target affiliation relation corresponding to the m notified by the receiving terminal according to the preset correspondences between different affiliation relations of CBs and CBGs and different values of m. For each CB included in the TB, the transmitting terminal retransmits the CB if it is determined according to the target affiliation relation that feedback information of all CBGs to which the CB is affiliated is NACK.

In the implementation, each affiliation relation uniquely corresponds to one value of m, and each m displacement corresponds to one affiliation relation in the above correspondences. For example, in the correspondence table, the affiliation relation in Table 2b is included in a case of m=2. After obtaining the m notified by the receiving terminal, the transmitting terminal may determine the target affiliation relation corresponding to m based on the correspondences, and determine the CB that needs to be retransmitted.

Several manners of notifying m are introduced below. In a first manner, a target control channel resource corresponding to the current value of m is determined according to pre-stored correspondences between different values of m and control channel resources, and feedback information corresponding to each CBG is sent to the transmitting terminal through the target control channel resource.

In a downlink data transmission process, the receiving terminal is a terminal, and different control channel resources are different Physical Uplink Control Channels (PUCCHs) resources. In an uplink data transmission process, the receiving terminal is a base station, and different control channel resources are different Physical Downlink Control Channels (PDCCHs) resources.

In the implementation, the technician can preset correspondences between different values of m and control channel resources, as shown in Table 5. The correspondences are stored in both the transmitting terminal and the receiving terminal. Here, each value of m uniquely corresponds to one affiliation relation.

TABLE 5

| m | Control channel resource |
| --- | --- |
| 1 | Resource block A |
| 2 | Resource block B |
| 3 | Resource block C |
| ... | ... |

After the target affiliation relation is determined, the value of m in the target affiliation relation is determined, and the control channel resource corresponding to the value of m is looked up in the above Table 5, and feedback information corresponding to each CBG is sent to the transmitting terminal through the control channel resource.

Correspondingly, the processing for obtaining by the transmitting terminal m notified by the receiving terminal may include operations as follows. The target control channel resource configured by the receiving terminal to send the feedback information is determined, and the value of m corresponding to the target control channel resource is determined according to the pre-stored correspondences between different values of m and the control channel resources.

In the implementation, upon receiving the HARQ, the transmitting terminal can determine a control channel resource used by the receiving terminal for sending the HARQ, and m corresponding to the control channel resource is looked up in Table 5, to determine the value of m.

In a second manner, a target scrambling sequence corresponding to a current value of m is determined according to pre-stored correspondences between different values of m and scrambling sequences, and feedback information corresponding to each CBG is sent to the transmitting terminal based on the target scrambling sequence. In the implementation, the technician can preset correspondences between different values of m and scrambling sequences, as shown in Table 6. The correspondences are stored in both the transmitting terminal and the receiving terminal. Here, each value of m uniquely corresponds to one affiliation relation.

TABLE 6

| m | Scrambling sequence |
| --- | --- |
| 1 | Sequence A |
| 2 | Sequence B |
| 3 | Sequence C |
| ... | ... |

After the target affiliation relation is determined, the value of m in the target affiliation relation is determined, and a target scrambling sequence corresponding to the value of m is looked up in above Table 6. Then, the target scrambling sequence is used to scramble the preset CRC sequence, and then the scrambled CRC sequence and the feedback information corresponding to each CBG are sent to the transmitting terminal together.

Correspondingly, the processing of obtaining, by the transmitting terminal, the m notified by the receiving terminal may include operations as follows. A target scrambling sequence configured by the receiving terminal to send feedback information corresponding to each CBG is determined, and m corresponding to the target scrambling sequence is determined according to the pre-stored correspondences of different values of m and scrambling sequences.

In the implementation, upon receiving the HARQ, the transmitting terminal may obtain the scrambled CRC in the HARQ, and then determine a scrambling sequence used for scrambling, and look up m corresponding to the scrambling sequence in Table 6 to determine the value of m.

In a third manner, the feedback information and m corresponding to each CBG are sent to the transmitting terminal. Correspondingly, m sent by the receiving terminal is received.

Figure 8A:
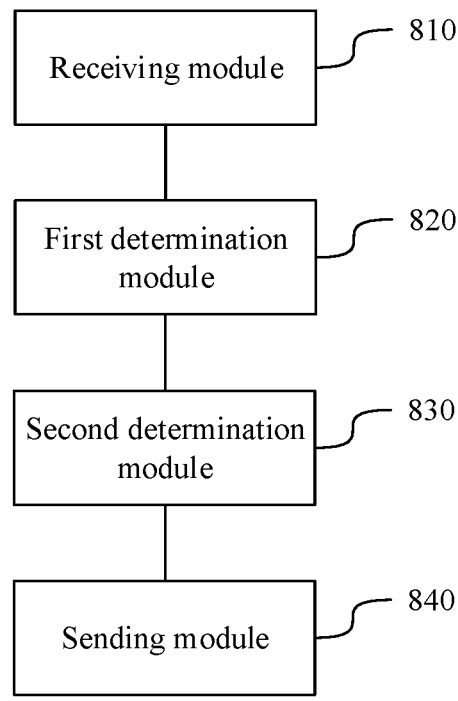
FIG. 8a, FIG. 8b, FIG. 8c, FIG. 8d, FIG. 8e and FIG. 8f are schematic structural diagrams of a device for data transmission provided by an exemplary embodiment.

A device for data transmission is provided in an embodiment of the present disclosure. The device can be used as a receiving terminal in the above embodiment. As shown in FIG. 8a, the device includes a receiving module 810, a first determination module 820, a second determination module 830 and a sending module 840.

The receiving module 810 is configured to receive a transmission block (TB) sent by the transmitting terminal. The TB includes multiple code blocks (CBs).

The first determination module 820 is configured to determine an erroneous CB in the TB, and determine whether each CBG includes the erroneous CB according to preset affiliation relations of CBs and code block groups (CBGs). In the affiliation relation, any one CB is affiliated to m CBGs, and m is a preset positive integer.

The second determination module 830 is configured to, for each CBG, determine that feedback information corresponding to the CBG is NACK if the CBG includes the erroneous CB, or determine feedback information corresponding to the CBG is ACK if the CBG does not include any erroneous CB.

The sending module 840 is configured to send feedback information corresponding to each CBG to the transmitting terminal.

Figure 8B:
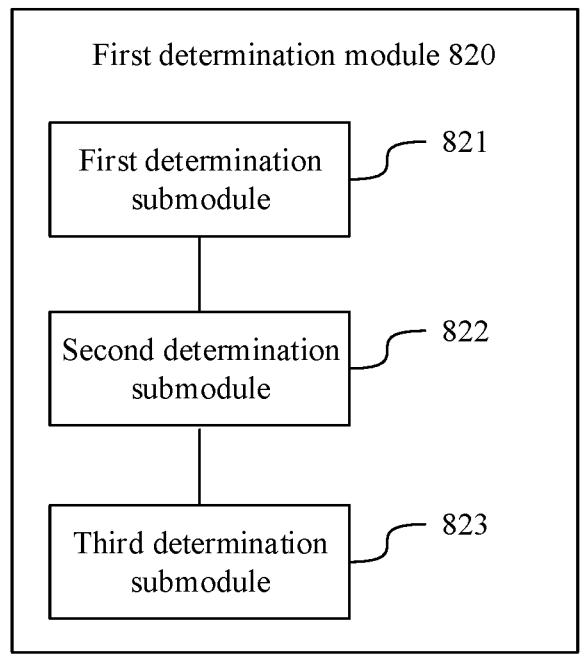

Optionally, as shown in FIG. 8b, the first determination module 820 includes a first determination submodule 821, a second determination submodule 822 and a third determination submodule 823. The first determination submodule 821 is configured to determine an error retransmission rate corresponding to each affiliation relation according to the erroneous CB in the TB and multiple preset affiliation relations of CBs and CBGs. The second determination submodule 822 is configured to determine a target affiliation relation with the lowest error retransmission rate among multiple affiliations relations. The third determination submodule 823 is configured to determine whether each CBG includes an erroneous CB according to the target affiliation relation. In the target affiliation relation, any one CB is affiliated to m CBGs, and m is a preset positive integer.

The sending module 840 is configured to send feedback information corresponding to each CBG to the transmitting terminal and notify the transmitting terminal of m.

Figure 8C:
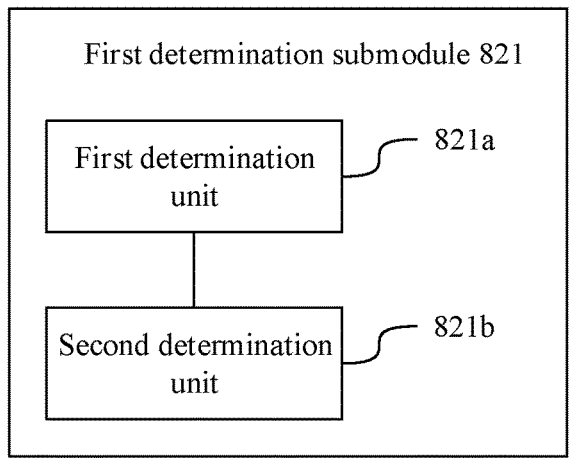

Optionally, as shown in FIG. 8c, the first determination submodule 821 includes a first determination unit 821a and a second determination unit 821b. The first determination unit 821a is configured to, for each of multiple preset affiliation relations of CBs and CBGs, determine multiple CB sets included in the affiliation relation. Any two CBs in the same CB set are affiliated to the same CBG, and no CBs in different CB sets are affiliated to the same CBG. The second determination unit 821b is configured to determine a CB set containing the erroneous CB, and determine an error retransmission rate corresponding to the affiliation relation according to the number of correct CBs in the CB set containing the erroneous CB and the number of correct CBs in the TB.

Figure 8D:
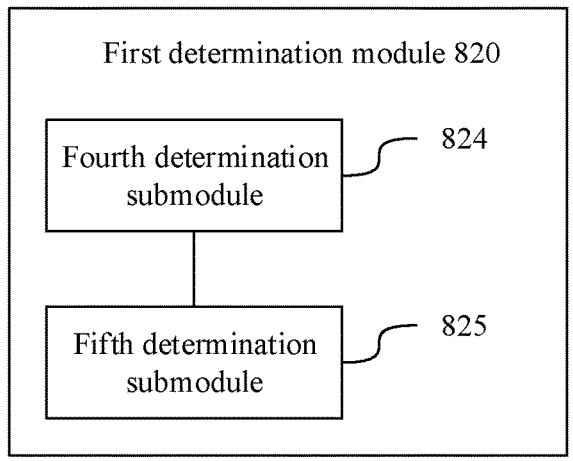

Optionally, as shown in FIG. 8d, the first determination module 820 includes: a fourth determination submodule 824 and a fifth determination submodule 825.

The fourth determination submodule 824 is configured to determine a target affiliation relation corresponding to information of a current signal status between the transmitting terminal and the receiving terminal according to preset correspondences between different affiliation relations of CBs and CBGs and different pieces of information of signal statuses.

The fifth determination submodule 825 is configured to determine whether each CBG includes the erroneous CB according to the target affiliation relation. In the target affiliation relation, any one CB is affiliated to m CBGs, and m is a preset positive integer.

Figure 8E:
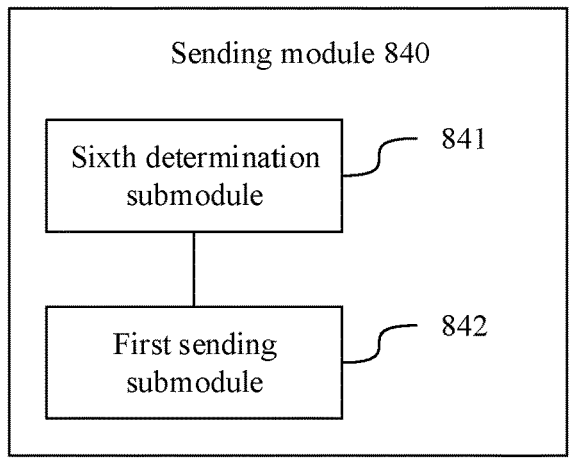

The sending module 840 is configured to send feedback information corresponding to each CBG to the transmitting terminal and notify the transmitting terminal of m. Optionally, as shown in FIG. 8e, the sending module 840 includes a sixth determination submodule 841 and a first sending submodule 842. The sixth determination submodule 841 is configured to determine a target control channel resource corresponding to the current value of m according to the pre-stored correspondences between different values of m and the control channel resources. The first sending submodule 842 is configured to send feedback information corresponding to each CBG to the transmitting terminal through the target control channel resource.

Figure 8F:
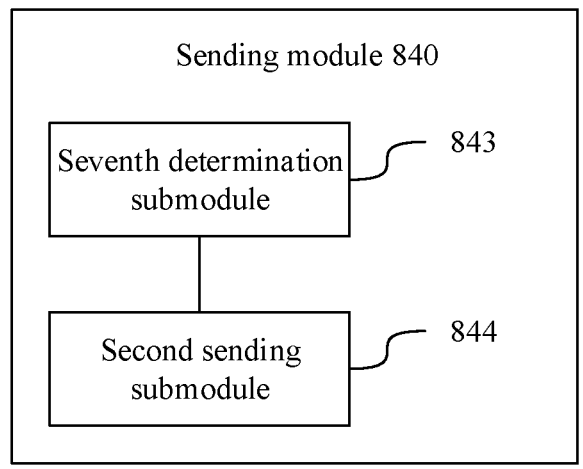

Optionally, as shown in FIG. 8f, the sending module 840 includes a seventh determination submodule 843 and a second sending submodule 844. The seventh determination submodule 843 is configured to determine a target scrambling sequence corresponding to a current value of m according to the pre-stored correspondences between different values of m and the scrambling sequences. The second sending submodule 844 is configured to send feedback information corresponding to each CBG to the transmitting terminal based on the target scrambling sequence. Optionally, the sending module 840 is configured to send the feedback information corresponding to each CBG and m to the transmitting terminal.

Figure 9A:
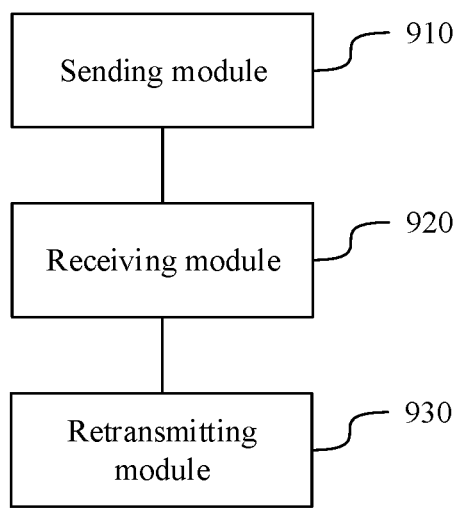
FIG. 9a, FIG. 9b, FIG. 9c and FIG. 9d are schematic structural diagrams of a device for data transmission provided by an exemplary embodiment.

A device for data transmission is provided in an embodiment of the present disclosure. The device can be used as a transmitting terminal in the above embodiment. As shown in FIG. 9a, the device can include a sending module 910, a receiving module 920 and a retransmitting module 930. The sending module 910 is configured to send a transmission block (TB) to the receiving terminal. The TB includes multiple code blocks (CBs). The receiving module 920 is configured to receive feedback information corresponding to each CBG sent by the receiving terminal. The retransmitting module 930 is configured to, for each CB included in the TB, retransmit the CB if it is determined according to a preset affiliation relation of CBs and CBGs that the feedback information of all CBGs to which the CB is affiliated is NACK. In the affiliation relation, any one CB is affiliated to m CBGs, and m is a preset positive integer.

Figure 9B:
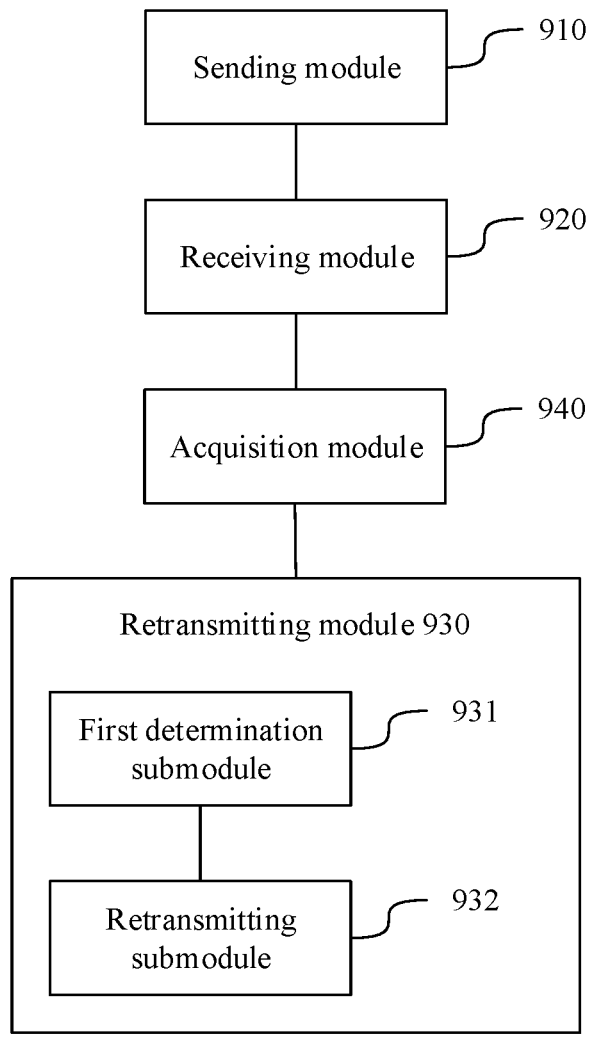

Optionally, as shown in FIG. 9b, the device further includes an acquisition module 940 configured to acquire m notified by the receiving terminal.

Figure 9C:
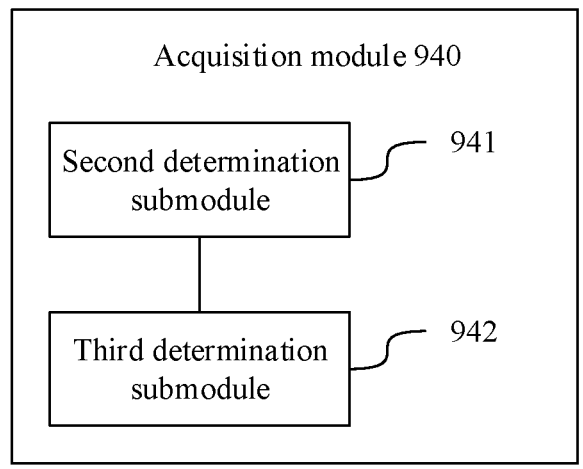

The retransmitting module 930 includes a first determination submodule 931 and a retransmitting submodule 932. The first determination submodule 931 is configured to determine a target affiliation relation corresponding to m notified by the receiving terminal according to correspondences between the preset different affiliation relations of CBs and CBGs and different values of m. The retransmission submodule 932 is configured to, for each CB included in the TB, retransmit the CB if it is determined according to the target affiliation relation that the feedback information of all CBGs to which the CB is affiliated is NACK. Optionally, as shown in FIG. 9c, the acquisition module 940 includes a second determination submodule 941 and a third determination submodule 942.

The second determination submodule 941 is configured to determine a target control channel resource configured by the receiving terminal to send the feedback information. The third determination submodule 942 is configured to determine a value of m corresponding to the target control channel resource according to pre-stored correspondences between different values of m and the control channel resources.

Figure 9D:
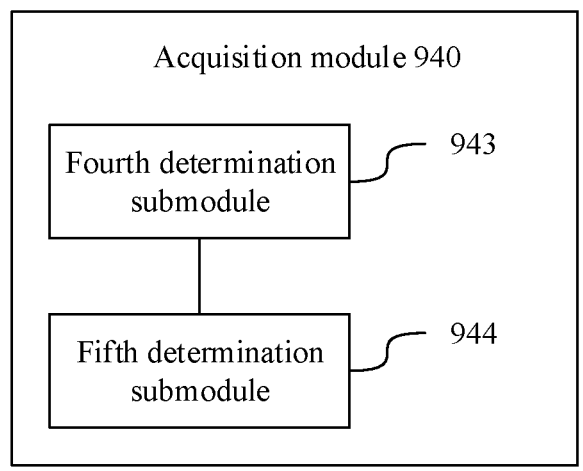

Optionally, as shown in FIG. 9d, the acquisition module includes a fourth determination submodule 943 and a fifth determination submodule 944. The fourth determination submodule 943 is configured to determine a target scrambling sequence configured by the receiving terminal to send the feedback information corresponding to each CBG. The fifth determination submodule 944 is configured to determine a value of m corresponding to the target scrambling sequence according to pre-stored correspondences between different values of m and scrambling sequences.

Optionally, the acquisition module 940 is configured to receive m sent by the receiving terminal.

It should be noted that when the device for data transmission provided in the above embodiments transmits data, the above division of the functional modules is only exemplified. In actual applications, the above functions can be allocated to be implemented by different functional modules as needed. That is, the internal structure of the device is divided into different functional modules to implement all or a part of the functions described above. In addition, the device for data transmission and the method for data transmission provided in the above embodiments belong to the same concept. For the specific implementation process of the device, reference may be made to the method embodiments, and details are not described here.

A system for data transmission is provided in an embodiment of the present disclosure, which includes a transmitting terminal and a receiving terminal. The transmitting terminal is configured to send a transport block (TB) to the receiving terminal. The TB includes multiple code blocks (CBs). The transmitting terminal is configured to receive feedback information corresponding to each code block group (CBG) sent by the receiving terminal, for each CB included in the TB, retransmit the CB if it is determined according to the preset affiliation relations of CBs and CBGs that the feedback information of all CBGs to which the CB is affiliated is NACK. In the affiliation relation, any one CB is affiliated to m CBGs, and m is a preset positive integer.

The receiving terminal is configured to receive the transport block (TB) sent by the transmitting terminal, determine an erroneous CB in the TB, and determine whether each CBG includes the erroneous CB according to a preset affiliation relation of CBs and CBGs; for each CBG, determine that the feedback information corresponding to the CBG is NACK if the CBG includes the erroneous CB, or determine that the feedback information corresponding to the CBG is ACK if the CBG does not include an erroneous CB; send the feedback information corresponding to each CBG to the transmitting terminal.

A structure diagram of a terminal device is shown in an embodiment of the present disclosure. The terminal may be a mobile phone, a tablet computer, and the like.

Figure 10:
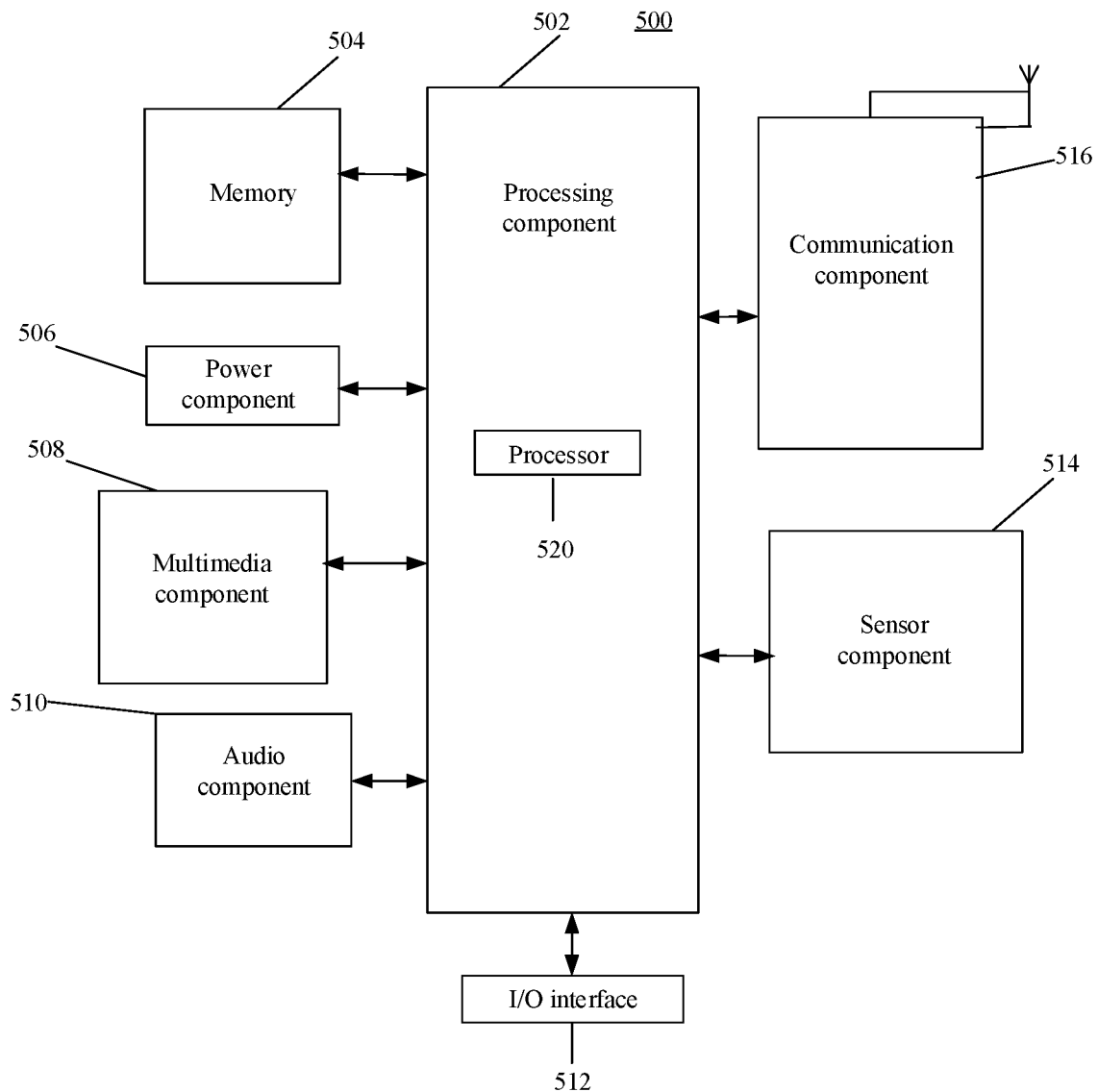
FIG. 10 is a schematic structural diagram of a terminal provided by an exemplary embodiment.

Referring to FIG. 10, the terminal 500 may include one or more of the following components a processing component 502, a memory 504, a power component 506, a multimedia component 508, an audio component 510, an Input/Output (I/O) interface 512, a sensor component 514 and a communication component 516.

The processing component 502 is typically configured to control overall operations of the terminal 500, such as the operations associated with display, telephone calls, data communications, camera operations, and recording operations. The processing component 502 may include one or more processors 520 to execute instructions to perform all or part of the operations in the abovementioned method. Moreover, the processing component 502 may include one or more modules which facilitate interaction between the processing component 502 and other components. For instance, the processing component 502 may include a multimedia module to facilitate interaction between the multimedia component 508 and the processing component 502.

The memory 504 is configured to store various types of data to support the operation of the terminal 500. Examples of such data include instructions for any application programs or methods operated on the terminal 500, contact data, phonebook data, messages, pictures, video, etc. The memory 504 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 506 is configured to provide power for various components of the terminal 500. The power component 506 may include a power management system, one or more power supplies, and other components associated with generation, management and distribution of power for the audio output device 500.

The multimedia component 508 can include a screen for providing an output interface between the terminal 500 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some examples, the multimedia component 508 may include a front camera and/or a rear camera. The front camera and/or the rear camera may receive external multimedia data when the terminal 500 is in an operation mode, such as a photographing mode or a video mode. Each of the front camera and the rear camera may be a fixed optical lens system or have focusing and optical zooming capabilities.

The audio component 510 is configured to output and/or input an audio signal. For example, the audio component 510 includes a Microphone (MIC), and the MIC is configured to receive an external audio signal when the audio output terminal 500 is in the operation mode, such as a call mode, a recording mode and a voice recognition mode. The received audio signal may further be stored in the memory 504 or transmitted through the communication component 516.

The I/O interface 512 is configured to provide an interface between the processing component 502 and a peripheral interface module, and the peripheral interface module may be a keyboard, a click wheel, a button, and the like. The button may include, but not limited to a home button, a volume button, a starting button, and a locking button.

The sensor component 514 may include one or more sensors configured to provide status assessment in various aspects for the terminal 500. For instance, the sensor component 514 may detect an on/off status of the terminal 500 and relative positioning of components, such as a display and small keyboard of the terminal 500, and the sensor component 514 may further detect a change in a position of the terminal 500 or a component of the terminal 500, presence or absence of contact between the user and the terminal 500, orientation or acceleration/deceleration of the terminal 500 and a change in temperature of the terminal 500. The sensor component 514 may include a proximity sensor configured to detect presence of an object nearby without any physical contact. The sensor component 514 may also include a light sensor, such as a Complementary Metal Oxide Semiconductor (CMOS) or Charge Coupled Device (CCD) image sensor, configured for use in an imaging APP. In some examples, the sensor component 514 may also include an acceleration sensor, a gyroscope sensor, a magnetic sensor, a pressure sensor, or a temperature sensor.

The communication component 516 is configured to facilitate wired or wireless communication between the terminal 500 and other equipment. The terminal 500 may access any communication-standard-based wireless network, such as a Wireless Fidelity (Wi-Fi) network, a 2nd-Generation (2G), 3rd-Generation (3G) or a combination thereof. In some embodiments of the present disclosure, the communication component 516 is configured to receive a broadcast signal or broadcast associated information from an external broadcast management system through a broadcast channel. In an exemplary embodiment, the communication component 516 may further include a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the terminal 500 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, a non-transitory computer-readable storage medium including instructions is further provided, such as the memory 504 including instructions. The instructions can be executed by the processor 520 of the terminal 500 to implement the abovementioned method. For example, the non-transitory computer-readable storage medium may be a read-only memory (ROM), a random access memory (RAM), a Compact Disc Read-Only Memory (CD-ROM), a magnetic tape, a floppy disc, an optical data storage device, and the like.

A non-transitory computer-readable storage medium is provided in another embodiment of the present disclosure. The instructions in the storage medium, when executed by a processor of a terminal, enable the terminal to perform the processing of the receiving terminal and the processing of the transmitting terminal according to the above embodiments.

Figure 11:
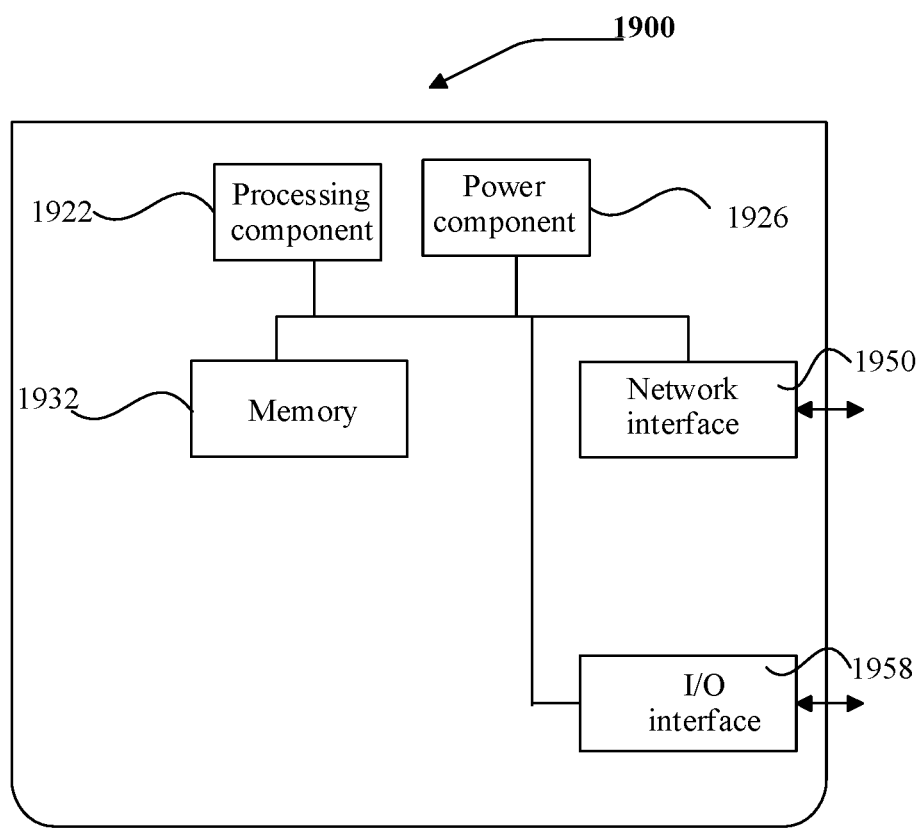
FIG. 11 is a schematic structural diagram of a terminal provided by an exemplary embodiment.

FIG. 11 is a block diagram of a device 1900 for data transmission according to an exemplary embodiment. For example, the device 1900 may be provided as a base station. Referring to FIG. 11, the device 1900 includes a processing component 1922, which further includes one or more processors, and memory resources represented by the memory 1932 for storing instructions executable by the processing component 1922, such as application programs. The application programs stored in the memory 1932 may include one or more modules each corresponding to a set of instructions. In addition, the processing component 1922 is configured to execute instructions to perform the method of transmission described above.

The device 1900 may also include a power component 1926 configured to perform power management of the device 1900, a wired or wireless network interface 1950 configured to connect the device 1900 to the network, and an Input/Output (I/O) interface 1958. The device 1900 can operate an operating system stored in the memory 1932, such as Windows Server™, Mac OS X™, Unix™, Linux™, FreeBSD™ or the like.

The device 1900 may include a memory, and one or more programs. The one or more programs are stored in the memory, and are configured to be executed by one or more processors. The one or more programs include the instructions for performing the above processing by the receiving terminal or the transmitting terminal.

Other implementation solutions of the present disclosure will be apparent to those skilled in the art from consideration of the specification and practice of the present disclosure. The present application is intended to cover any variations, uses, or adaptations of the present disclosure conforming to the general principles thereof and including such departures from the present disclosure as come within known or customary practice in the art. The specification and embodiments are exemplary, and a true scope and spirit of the present disclosure are indicated by the following claims.

It will be appreciated that the present disclosure is not limited to the exact construction that has been described above and illustrated in the accompanying drawings, and that various modifications and changes may be made without departing from the scope of the present disclosure. It is intended that the scope of the present disclosure is only limited by the appended claims.

The invention claimed is:

1. A method for data transmission that is executed by a receiving terminal, the method comprising:
   receiving a transport block (TB) that is sent by a transmitting terminal, the TB comprising a plurality of code blocks (CBs);
   determining an erroneous CB in the TB, and determining whether each code block group (CBG) comprises the erroneous CB according to preset affiliation relations of the CBs and the CBGs, wherein any one of the CB is affiliated to m CBGs and m is a preset positive integer in the affiliation relation;
   for each of the CBGs, determining that feedback information corresponding to the CBG is negative acknowledge (NACK) when the CBG comprises the erroneous CB, or determining that feedback information corresponding to the CBG is acknowledge (ACK) when the CBG does not comprise erroneous CB; and
   sending the feedback information corresponding to each CBG to the transmitting terminal and notifying the transmitting terminal of m;
   wherein determining whether each CBG comprises the erroneous CB according to the preset affiliation relations of the CBs and the CBGs comprises:
   determining an error retransmission rate corresponding to each of the preset affiliation relations according to the erroneous CB in the TB and the preset affiliation relations of the CBs and the CBGs; determining a target affiliation relation with a lowest error retransmission rate among the preset affiliation relations; and determining whether each CBG comprises the erroneous CB according to the target affiliation relation, or
   determining a target affiliation relation corresponding to information of a current signal status between the transmitting terminal and the receiving terminal according to correspondences between different preset affiliation relations of the CBs and the CBGs and different pieces of information of signal statuses, the information of the signal status being used for determining quality of a signal between the transmitting terminal and the receiving terminal; and determining whether each CBG comprises the erroneous CB according to the target affiliation relation.

2. The method of claim 1, wherein determining the error retransmission rate corresponding to each of the preset affiliation relations according to the erroneous CB in the TB and the preset affiliation relations of the CBs and the CBGs further comprises:
   for each of the preset affiliation relations of CBs and CBGs, determining a plurality of CB sets in the affiliation relation, wherein any two of the CBs in a same CB set are affiliated to a same CBG and no CBs from different CB sets are affiliated to a same CBG; and
   determining the CB set containing the erroneous CB, and determining the error retransmission rate corresponding to the affiliation relation according to a number of correct CBs in the CB set containing the erroneous CB and a number of correct CBs in the TB.

3. The method of claim 1, wherein sending the feedback information corresponding to each CBG to the transmitting terminal and notifying the transmitting terminal of m further comprises:
   determining a target control channel resource corresponding to a current value of m according to pre-stored correspondences between different values of m and control channel resources; and
   sending the feedback information corresponding to each CBG to the transmitting terminal through the target control channel resource.

4. The method of claim 1, wherein sending the feedback information corresponding to each CBG to the transmitting terminal and notifying the transmitting terminal of m further comprises:
   determining a target scrambling sequence corresponding to a current value of m according to pre-stored correspondences between different values of m and scrambling sequences; and
   sending the feedback information corresponding to each of the CBG to the transmitting terminal based on the target scrambling sequence.

5. The method of claim 1, wherein sending the feedback information corresponding to each CBG to the transmitting terminal and notifying the transmitting terminal of m further comprises:
   sending the feedback information corresponding to each of the CBG and m to the transmitting terminal.

6. A method for data transmission that is executed by a transmitting terminal, the method comprising:
   sending a transmission block (TB) to a receiving terminal, the TB comprising a plurality of code blocks (CBs);
   receiving feedback information corresponding to each code block group (CBG) sent by the receiving terminal; and
   for each CB comprised in the TB, retransmitting the CB when it is determined according to preset affiliation relations of the CBs and the CBGs that feedback information of all of the CBGs to which the CB is affiliated is negative acknowledge (NACK), wherein any one of the CB is affiliated to m CBGs and m is a preset positive integer in the affiliation relation,
   the method further comprising: obtaining m notified by the receiving terminal;
   wherein for each CB comprised in the TB, retransmitting the CB when it is determined according to the preset affiliation relations of the CBs and the CBGs that the feedback information of all of the CBGs to which the CB is affiliated is NACK comprises:
   determining a target affiliation relation corresponding to m notified by the receiving terminal according to correspondences between the preset different affiliation relations of the CBs and the CBGs and different values of m; and
   for each CB comprised in the TB, retransmitting the CB when it is determined according to the target affiliation relation that the feedback information of all CBGs to which the CB is affiliated is NACK.

7. The method of claim 6, wherein obtaining m notified by the receiving terminal further comprises:
   determining a target control channel resource configured by the receiving terminal to send the feedback information; and
   determining m corresponding to the target control channel resource according to pre-stored correspondences between different values of m and control channel resources.

8. The method of claim 6, wherein obtaining m notified by the receiving terminal further comprises:
   determining a target scrambling sequence that is configured by the receiving terminal to send the feedback information corresponding to each CBG; and determining m corresponding to the target scrambling sequence according to pre-stored correspondences between different values of m and scrambling sequences.

9. The method of claim 6, wherein obtaining m notified by the receiving terminal further comprises receiving m sent by the receiving terminal.

10. A device for data transmission, comprising a processor and a memory having stored thereon at least one instruction, wherein the processor is configured to execute the instruction to implement:
receiving a transport block (TB) sent by a transmitting terminal, the TB comprising a plurality of code blocks (CBs);
determining an erroneous CB in the TB, and determining whether each code block group (CBG) comprises the erroneous CB according to preset affiliation relations of the CBs and the CBGs, wherein any one of the CB is affiliated to in CBGs and m is a preset positive integer in the affiliation relation;
for each of the CBGs, determining that feedback information corresponding to the CBG is negative acknowledge (NACK) when the CBG comprises the erroneous CB, or determining that feedback information corresponding to the CBG is acknowledge (ACK) when the CBG does not comprise erroneous CB; and
sending the feedback information corresponding to each of the CBG to the transmitting terminal and notifying the transmitting terminal of m;
wherein the processor is further configured to execute the instruction to implement:
determining an error retransmission rate corresponding to each of the preset affiliation relations according to the erroneous CB in the TB and the preset affiliation relations of the CBs and the CBGs: determining a target affiliation relation with a lowest error retransmission rate among the preset affiliation relations; and determining whether each CBG comprises the erroneous CB according to the target affiliation relation, or
determining a target affiliation relation corresponding to information of a current signal status between the transmitting terminal and a receiving terminal according to correspondences between different preset affiliation relations of the CBs and the CBGs and different pieces of information of signal statuses, the information of the signal status being used for determining quality of a signal between the transmitting terminal and the receiving terminal; and
determining whether each CBG comprises the erroneous CB according to the target affiliation relation.

11. The device of claim 10, wherein the processor is configured to execute the instruction to implement:
for each of the preset affiliation relations of the CBs and the CBGs, determining a plurality of CB sets in the affiliation relation, wherein any two CBs in a same CB set are affiliated to a same CBG and no CB from different CB sets are affiliated to a same CBG; and
determining the CB set containing the erroneous CB, and determining the error retransmission rate corresponding to the affiliation relation according to a number of correct CBs in the CB set containing the erroneous CB and a number of correct CBs in the TB.

12. The device of claim 10, wherein the processor is further configured to execute the instruction to implement:
determining a target control channel resource corresponding to a current value of m according to pre-stored correspondences between different values of m and control channel resources; and
sending the feedback information corresponding to each of the CBG to the transmitting terminal through the target control channel resource.

13. The device of claim 10, wherein the processor is further configured to execute the instruction to implement:
determining a target scrambling sequence corresponding to a current value of m according to pre-stored correspondences between different values of m and scrambling sequences; and
sending the feedback information corresponding to each CBG to the transmitting terminal based on the target scrambling sequence.

14. The device of claim 10, wherein the processor is further configured to execute the instruction to implement:
sending the feedback information corresponding to each CBG and m to the transmitting terminal.

15. A device for data transmission, comprising a processor and a memory having stored thereon at least one instruction, wherein the processor is configured to execute the instruction to implement the operations of the method for data transmission of claim 6.

* * * * *